United States Patent [19]

Tominaga

[11] Patent Number: 5,108,070
[45] Date of Patent: Apr. 28, 1992

[54] FLOW CONTROL SOLENOID VALVE APPARATUS

[75] Inventor: Tsutomu Tominaga, Himeji, Japan

[73] Assignee: Mitsubishi Denki Kabushiki Kaisha, Tokyo, Japan

[21] Appl. No.: 675,008

[22] Filed: Mar. 26, 1991

[30] Foreign Application Priority Data

Mar. 28, 1990 [JP] Japan ................... 2-79619

[51] Int. Cl.⁵ ................ F15B 13/044; F16K 31/08
[52] U.S. Cl. ........................... 251/65; 137/625.65; 251/129.1; 361/154
[58] Field of Search ............ 137/625.65; 251/65, 251/129.1; 361/154, 210

[56] References Cited

U.S. PATENT DOCUMENTS 4,609,965  9/1986  Baker ..................... 361/154 X
4,749,167  6/1988  Gottschall ............. 251/129.1 X

FOREIGN PATENT DOCUMENTS 2-26773  7/1990  Japan.
513204   5/1976  U.S.S.R. ............... 251/129.1

*Primary Examiner*—Gerald A. Michalsky
*Attorney, Agent, or Firm*—Sughrue, Mion, Zinn, Macpeak and Seas

[57] ABSTRACT

The solenloid coils 26, 27 of a hydraulic spool valve may be selectively connected in series or parallel by a switch unit 101. The series connection is used during normal control operations, but if the valve spool 4 becomes jammed the unit switches over to the parallel connection. This quadruples the coil current, and the attendantly increased magnetic drive force enables the spool to shear through the contaminant particles entrained in the hydraulic fluid that are causing the jamming.

1 Claim, 5 Drawing Sheets

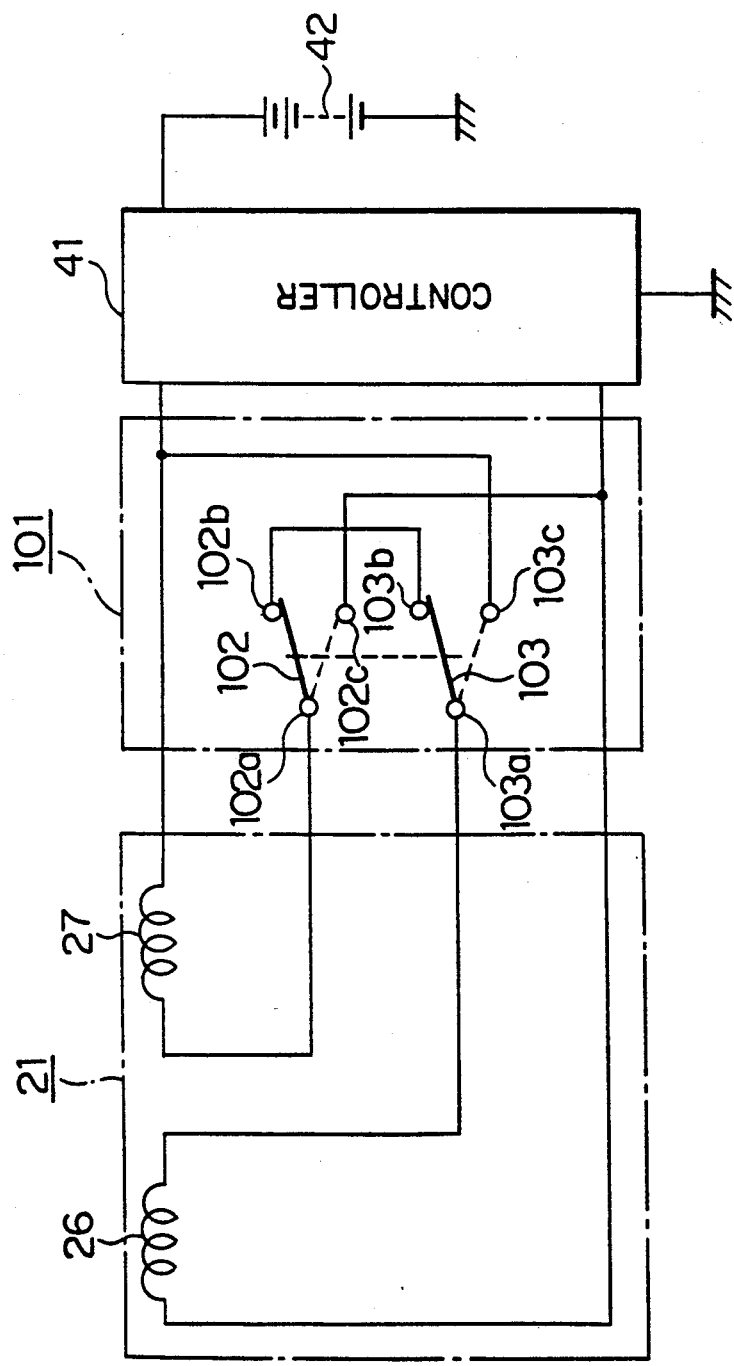
F I G. 2

FLOW CONTROL SOLENOID VALVE APPARATUS

BACKGROUND OF THE INVENTION

This invention relates to a flow control solenoid valve apparatus and, more particularly, to a the flow control solenoid valve apparatus for electrically controlling flow rate of a working oil of a vehicular steering apparatus or other industrial apparatus.

FIG. 4 is a sectional view of a conventional solenoid valve of the type to which the present invention is directed, and FIG. 5 is a block diagram of the solenoid and the controller of the solenoid valve illustrated in FIG. 4.

In FIGS. 4 and 5, the solenoid valve apparatus comprises a valve body 1 having formed therein a central valve bore 2. The central bore 2 is provided with a first output port 3a, a second output port 3b and a supply port 3c between the first and the second output ports 3a and 3b and connectable to an oil pump 10. A drain port 3d is formed outside of the first and the second output ports so that it is connected to an oil tank 12 through a filter 11.

Within the central valve bore 2, a valve spool 4 is slidably disposed. The valve spool 4 is in an underlapping relationship with respect to the valve bore 2. The valve spool 4 is elastically supported at its opposite ends by centering springs 5a and 5b and biased to a neutral position illustrated in the figure. Between each of the centering springs 5a and 5b and the valve spool 4 are retainers 6a and 6b, which prevent either one of the springs 5a and 5b from acting on the valve spool 4 when it is shifted away from that spring 5a or 5b beyond a certain limit.

At one end of the valve body 1, a solenoid actuator 21 for actuating the valve spool 4 is mounted. The solenoid actuator 21 comprises a hollow cylindrical yoke 22 having secured at its opposite ends a first magnetic core 23 and a second magnetic core 24. Also, a permanent magnet 25 magnetized in the radial direction is disposed at an axially central position within the yoke 22, and a first coil 26 wound on a coil bobbin 28 is mounted between the permanent magnet 25 and the first magnetic core 23, and a second coil 27 wound on a coil bobbin 29 is mounted between the permanent magnet 25 and the second magnetic core 24. The first coil 26 and the second coil 27 are electrically connected in series as illustrated in FIG. 5.

Mounted on the inner surface of the permanent magnet 25 is a third core 30 within an inner surface of which a sleeve bearing 31 is press fitted. The sleeve bearing 31 has on its inner surface a tetrafluoroethylene (Teflon: Trade Name) coating layer of about 0.3 mm to provide a low friction coefficient and a cylindrical magnetic gap (sliding gap) in relation to a plunger 32 slidable within the sleeve bearing 31.

Each portion of the first and the second magnetic cores 23 and 24 opposing the end faces of the plunger 32 is provided with a cylindrical portion 33 or 34 having a diameter larger than that of the plunger 32 in order that the axial dimensions of the cylindrical magnetic gap change in response to the axial position of the plunger 32.

Reference numeral 41 indicates a controller for controlling a current supply to the solenoid actuator 21 by chopping a dc current from a dc source 42 and varying the duty cycle (ON-OFF ratio) of the supplied current.

The operation will now be described. When the first and second coils 26 and 27 of the solenoid actuator 21 are not energized, the magnetic flux $\phi c$ shown by dash line in FIG. 4 is not provided, so that only first and second magnetic fluxes $\phi m1$ and $\phi m2$ generated in opposite directions from the N pole of the permanent magnet 25 are maintained. The first magnetic flux $\phi m1$ appears in a first closed magnetic circuit which extends from the N pole of the permanent magnet 25, through the yoke 22, the first core 23, the cylindrical portion 33, the plunger 32, the sleeve bearing 31, and the third core 30 to return into the S pole of the permanent magnet 25. The second magnetic flux $\phi m2$ appears in a second closed magnetic circuit which extends from the N pole of the permanent magnet 25, through the yoke 22, the second core 24, the cylindrical portion 34, the plunger 32, the sleeve bearing 31 and the third core 30 to return into the S pole of the permanent magnet 25.

A leftward attraction force is generated by the magnetic flux $\phi m1$ between the cylindrical portion 33 and the left end of the plunger 32, and a rightward attraction force is generated by the magnetic flux $\phi m2$ between the cylindrical portion 34 and the right end of the plunger 32. Since both attraction forces are substantially equal and the valve spool 4 is biased in the central position by the action of the centering springs 5a and 5b, the valve spool 4 is maintained in the neutral position, so that the high pressure working-oil introduced from the supply port 3c is returned to the oil tank 12 through throttles 7a and 7b at the supply sides, throttles 8a and 8b at the drain sides and through the drain port 3d.

At this time, since the throttles on the right and left sides of the valve are equal to each other, the fluid pressure at the output ports 3a and 3b is kept equal, so that the piston 14 of a power cylinder 13 is maintained at the illustrated position.

When the first and second coils 26 and 27 of the solenoid actuator 21 are energized, the magnetic flux $\phi c$ illustrated by dash line in FIG. 4 is generated to extend through the yoke 22, the first core 23, the cylindrical portion 33, the plunger 32, the cylindrical portion 34 and the second core 24.

At this time, the resultant magnetic flux which passes through the cylindrical portion 33 of the first core 23 and the left end of the plunger 32 is a sum of the first magnetic flux $\phi m1$ generated by the permanent magnet 25 and the magnetic flux $\phi c$ generated by the first and second coils 26 and 27, so that the magnetic attractive force toward the left acting on the plunger 32 is increased.

On the other hand, the magnetic flux which passes through the cylindrical portion 34 of the first core 24 and the right end of the plunger 32 is a substraction between the second magnetic flux $\phi m2$ generated by the permanent magnet 25 and the magnetic flux $\phi c$ generated by first and the second coils 26 and 27, so that the magnetic attractive force toward the right acting on the plunger 32 is decreased.

The plunger 32 is subjected to a leftward attractive force generated at its left end and a rightward attractive force generated at its right end which result in a leftward differential drive force, so that the plunger 32 is moved to the left as viewed in the figure to a position where the drive force equals the centering spring 5a force action against the valve spool 4.

Since the magnetic gap at the attraction portion is cylindrical, an attractive force of a substantially flat profile is generated when the plunger 32 is positioned on the left side of the neutral position.

When the valve spool 4 is moved to the left by the force generated by the solenoid actuator 21, the throttle 7a is widened whereas the throttle 7b is narrowed. Also, the throttle 8a on the drain side is narrowed and the throttle 8b on the drain side is widened.

This causes the oil pressure within the first output port 3a to increase and the oil pressure within the second output port 3b to decrease, so that the piston 14 of the power cylinder 13 is moved to the right.

When the direction of currents flowing through the first and the second coils 26 and 27 of the solenoid actuator 21 are changed so that a magnetic flux opposite to the magnetic flux $\phi c$ of FIG. 4 is generated, the operation is similar but opposite in direction, so that the description of the operation is omitted.

Since the conventional solenoid flow rate control apparatus is constructed as above described, the coils of the solenoid actuator 21 must be of a large-current type which generates a very large drive force so that the valve spool 4 can shear dust particles in the working oil caught within the valve and can be moved as designed. When large-current type solenoid coils are used, the current flowing through the solenoid during normal flow rate controlling is decreased, disadvantageously degrading the flow rate controllability of the fluid.

SUMMARY OF THE INVENTION

Accordingly, one object of the present invention is to provide a flow control solenoid valve apparatus free from the above discussed problems.

Another object of the present invention is to provide a flow control solenoid valve apparatus in which a controllablity required during a normal flow controlling operation as well as a very large drive force required when dusts are caught in the valve are maintained.

With the above objects in view, the flow control solenoid valve apparatus of the present invention comprises a flow control valve having a valve body and a valve member slidable within the valve body for controlling flow rate through the flow control valve, and a solenoid actuator connected to the flow control valve for controlling the operation of the latter. The solenoid actuator comprises a magnetic core assembly connected to the valve body and having a central bore, a plunger connected to the valve member and extending into the central bore of the magnetic core assembly. The actuator further comprises a pair of coils spaced apart from each other and supported around the plunger for generating first and second magnetic fields extending through the magnetic core assembly for acting on the plunger. A permanent magnet is disposed between the coils for generating third and fourth magnetic fields acting on the plunger in a direction opposite to each other in an overlapping relationship with respect to the first and second magnetic fields. The apparatus further comprises a switch unit for switching the coils between a parallel position in which the coils are connected in parallel and a series position in which the coils are connected in series, whereby a resultant magnetic force of the magnetic fields acting on the plunger can be significantly changed according to the position of the magnetic coils.

With the flow control solenoid valve apparatus of the present invention, a switch unit can be operated when a very large valve spool drive force is needed to switch the coils from the series-connection position to the parallel-connection position. The electric resistance through the coils is then reduced to one-fourth, whereby an amount of current through the coils of the solenoid actuator is increased and the magnetic drive force generated in correspondence with the current is also increased.

BRIEF DESCRIPTION OF THE DRAWINGS

The present invention will become more readily apparent from the following detailed description of the preferred embodiment of the present invention taken in conjunction with the accompanying drawings, in which:

FIG. 2 is a block diagram of the solenoid actuator and the controller of the apparatus illustrated in FIG. 1;

DESCRIPTION OF THE PREFERRED EMBODIMENT

Figure 1:
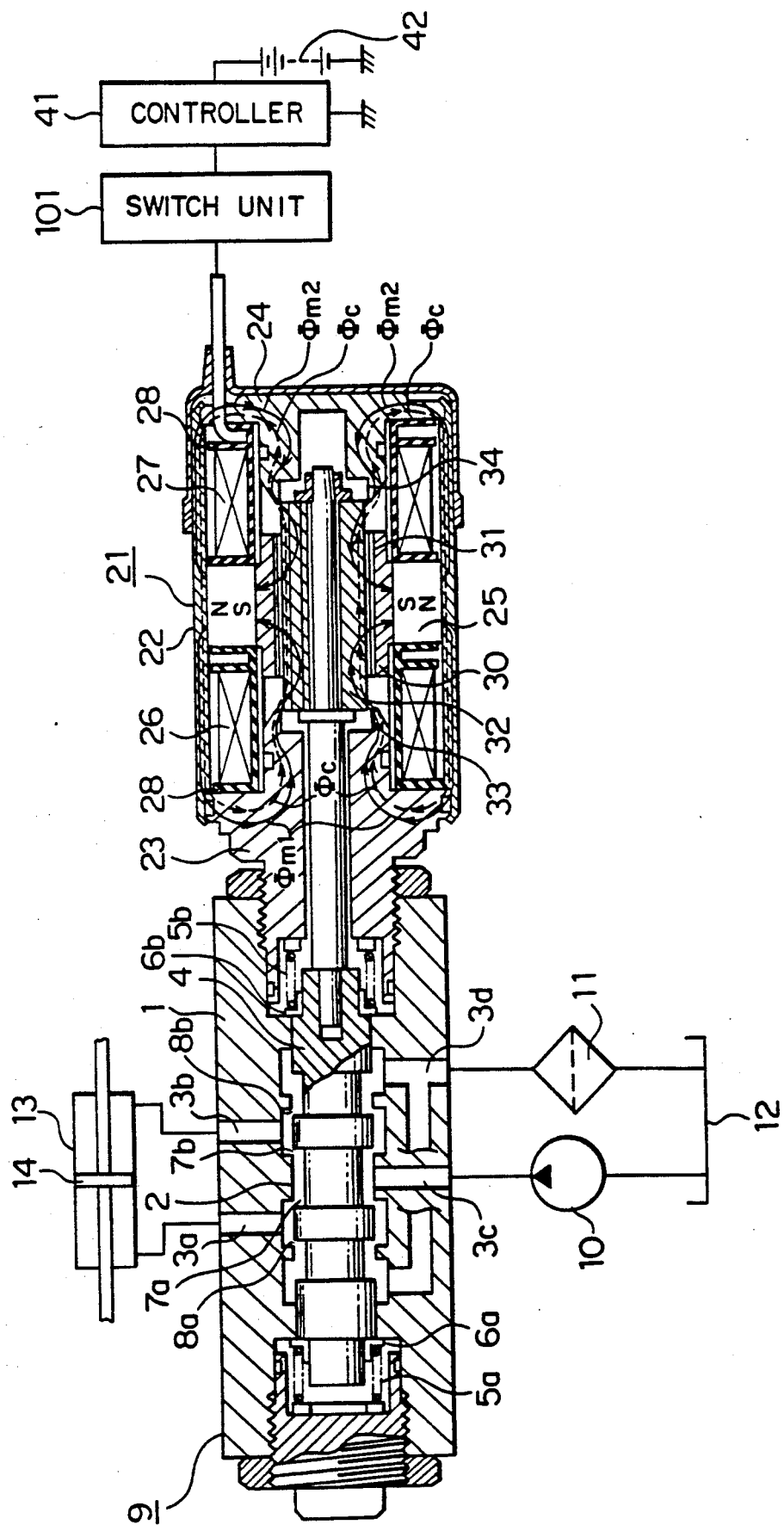
FIG. 1 is a sectional view of the flow control solenoid valve apparatus of one embodiment of the present invention.
Figure 4:
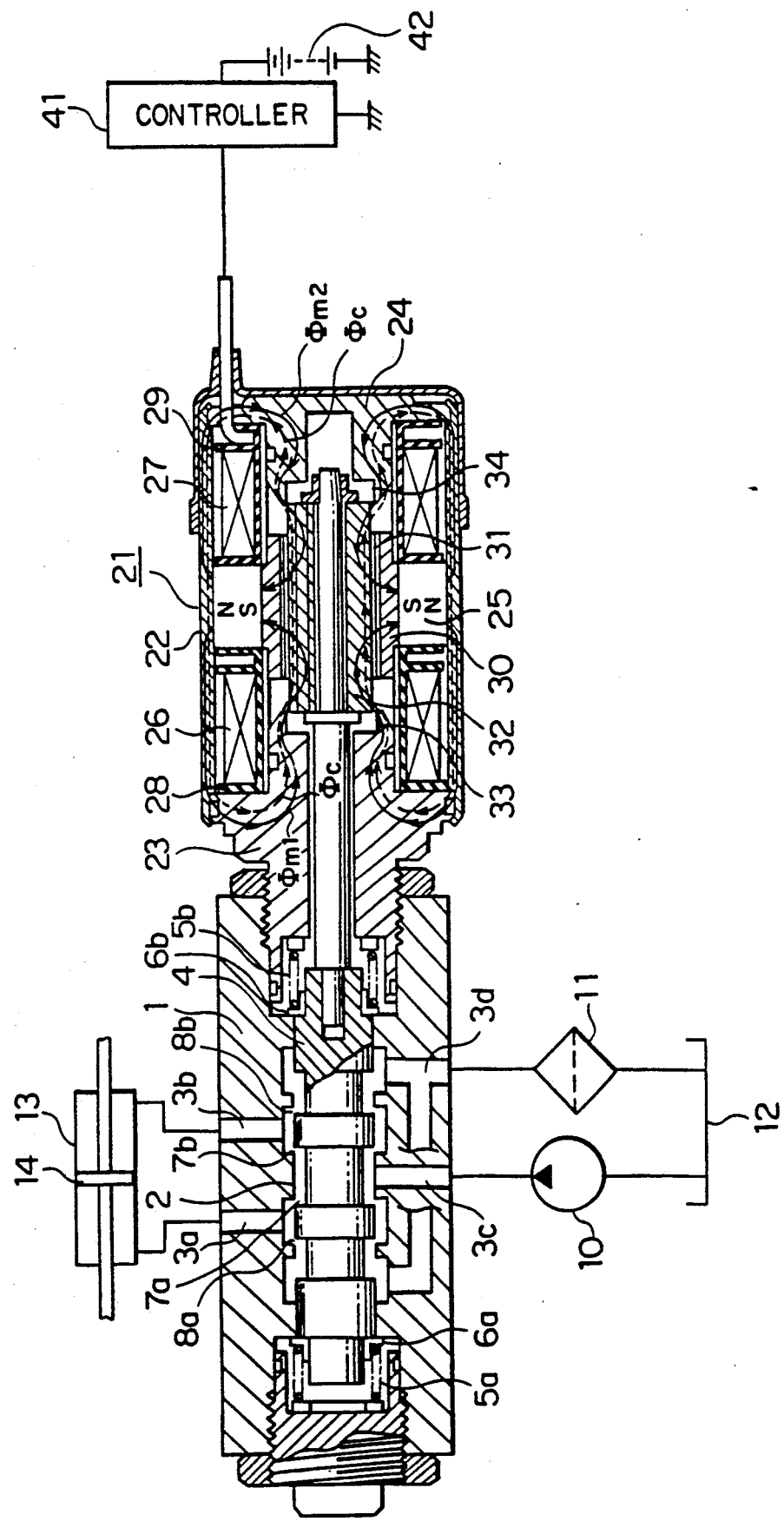
FIG. 4 is a sectional view of a conventional flow control valve apparatus.
Figure 5:
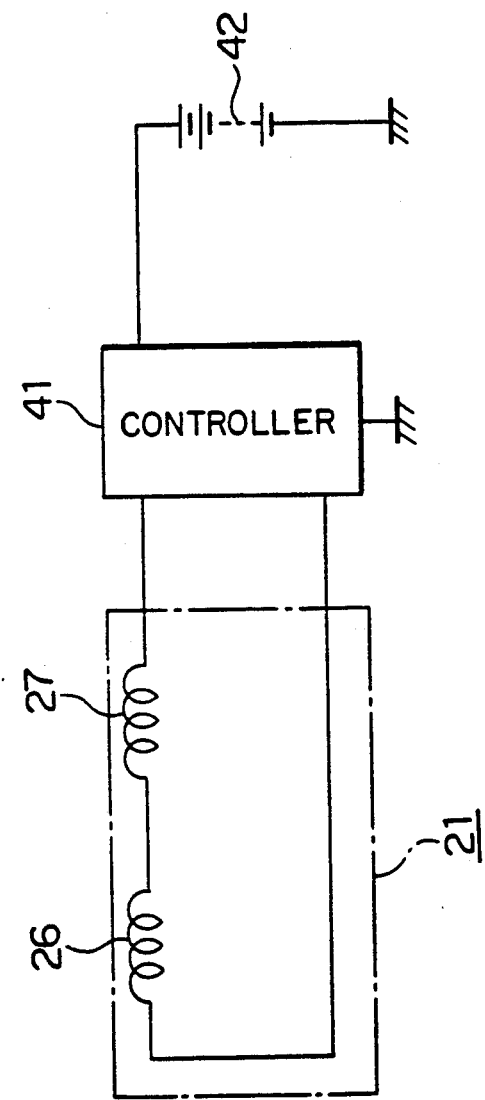
FIG. 5 is a block diagram of the solenoid actuator and the controller of the apparatus illustrated in FIG. 4.

FIGS. 1 and 2 illustrate the flow control solenoid valve apparatus of the present invention. Comparing FIGS. 1 and 2 with FIGS. 4 and 5, it is seen that two structures are similar and the components designated by the reference numerals 1 to 14, 21 to 34, 41 and 42 are identical to those illustrated in FIGS. 4 and 5.

Thus, the flow control solenoid valve apparatus of the present invention comprises a flow control valve 9 having the valve body 1 and the valve member 4 in the form of a valve spool axially slidably disposed within the valve body 1 for controlling the flow rate of the working fluid through the flow control valve 9. The flow control solenoid valve apparatus also comprises the solenoid actuator 21 connected to the flow control valve 9 for controlling the operation of the flow control valve 9.

The solenoid actuator 21 comprises the magnetic core assembly connected to one end of the valve body 1. The magnetic core assembly includes the first magnetic core 23 securely attached to the valve body 1, the hollow cylindrical magnetic yoke 22, and the second magnetic core 24. It is seen that the magnetic core assembly has a central bore through which the plunger 32 extends for axial sliding movement therein. The plunger 32 is concentric to the flow control valve 9 and has one end connected to the valve spool 4 and the other end having a magnetic armature extending into the magnetic core assembly.

The solenoid actuator 21 further comprises the first and the second coils 26 and 27 which are axially spaced apart from each other and supported within the magnetic core assembly. The first and second coils 26 and 27 wound in the same direction are disposed around the plunger 32 for generating the resultant magnetic field or flux $\phi c$ extending through the magnetic core assembly and acting on the plunger 32.

The permanent magnet 25 is disposed within the magnetic core assembly between the first and second coils 26 and 27 for generating the first and second magnetic fluxes $\phi m1$ and $\phi m2$ acting on the plunger 32 in a direction opposite to each other in an overlapping relationship with respect to the resultant magnetic flux $\phi c$ generated from the first and second magnetic coils 26 and 27.

According to the present invention, the flow control solenoid valve apparatus comprises a switch unit 101 connected between the solenoid actuator 21 and the controller 41 as best seen from FIG. 2. The switch unit 101 is connected to the first and second coils 26 and 27 for switching them between a series position illustrated by solid lines in FIG. 2 in which the coils 26 and 27 are connected in series with each other and a parallel position illustrated by dash lines in FIG. 2 in which the coils 26 and 27 are connected in an electrically parallel relationship.

The switch unit 101 comprises a first switch 102 and a second switch 103 which are interlocked or ganged to each other as depicted by a dash line. It is seen that outer ends of the first and the second coils 26 and 27 are connected to the controller 41 through the switch unit 101, and the first switch 102 has a common terminal 102a connected to an inner end of the second coil 27, and the second switch 103 has a common terminal 103a connected to an inner end of the first coil 26. Also, an NC terminal 102b of the first switch 102 is connected to an NC terminal 103b of the second switch 103, an NO terminal 102c of the first switch 102 is connected to a conductor between the outer end of the first coil 26 and the controller 41, and an NO terminal 103c of the second switch 103 is connected to a conductor between the outer end of the second coil 27 and the controller 41.

During an ordinary flow control mode of operation, the common terminal 102a of the first switch 102 is connected to the NC terminal 102b and the common terminal 103a of the second switch 103 is connected to the NC terminal 103b as illustrated by the solid lines in FIG. 2. In this state, the drive current from the controller 41 flows through the second coil 27, the first switch 102, the second switch 103 and the first coil 26 to return to the controller 41.

Figure 3:
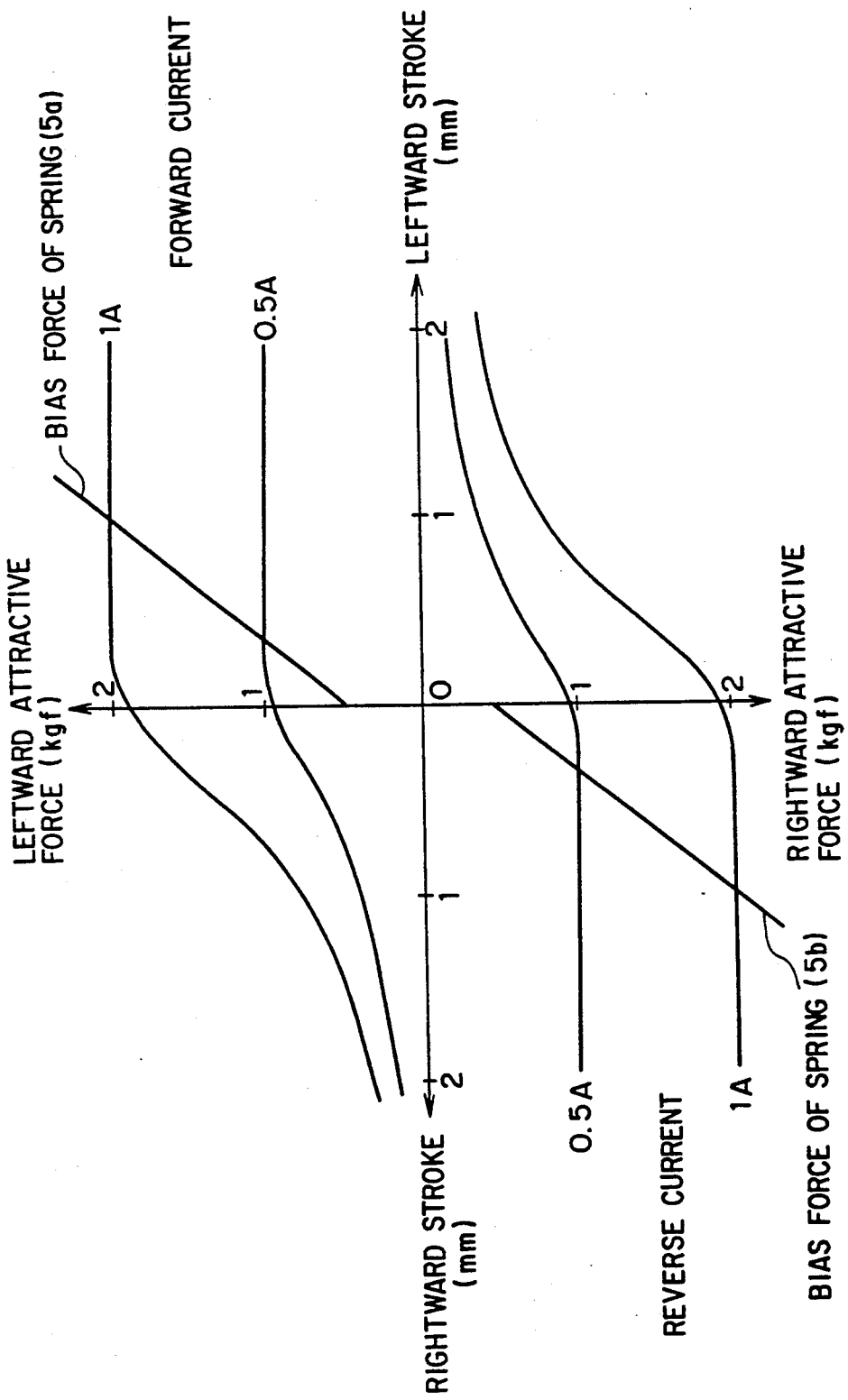
FIG. 3 is a graph illustrating a relationship between the stroke and the attractive force.

When it is assumed that the voltage of the battery 42 is 12 V, the ON-duty of the controller 41 is 50% and that the electric resistances of the first and the second coils 26 and 27 are 3 $\Omega$ each, then the electric resistance of the solenoid actuator 21 is 6 $\Omega$ because the coils 26 and 27 are series connected, whereby the average value of the drive current is 1 A and the attractive force generated is about 2 kgf from the graph of FIG. 3.

When the ON duty (current carrying time/one cycle of drive frequency) of the controller 41 is made 100% to supply the same voltage as that of the battery 42 to the solenoid actuator 21, a current of 2 A flows through the coils to generate an attractive force of about 4 kgf at maximum. However, since the hysteresis of the attractive force characteristics (the difference in the forward and backward thrusts when the current or the stroke is reciprocated) increases as the ON-duty reaches 100%, the controllability of the flow rate is deteriorated.

When the valve spool 4 is jammed due to any foreign matter such as a dust or the like within the working oil caught in the valve and the foreign matter cannot be cut or sheared with the attraction force of about 4 kgf to restore to the normal condition, the common terminal 102a of the first switch 102 is shifted to be connected to the NO terminal 102c and the common terminal 103a of the second switch 103 is connected to the NO terminal 103c.

Then, the electric resistance of the solenoid actuator 21 becomes 1.5 $\Omega$ because the first and the second coils are connected in parallel, and when the same voltage as that of the battery 42 is applied to the solenoid actuator 21, the current that flows through the first and the second coils 26 and 27 is 8 A, generating an attractive force of more than 10 kgf, which is sufficient for shearing or cutting the foreign matter such as dust caught between the valve body and the valve spool, allowing the solenoid valve to be restored to its normal position.

While a mechanical switch is used as the switch unit in the above embodiment, an electronic switching device such as a transistor may equally be used.

As has been described, according to the flow control solenoid valve apparatus of the present invention, a switch unit can be operated when a very large valve spool drive force is needed to switch the coils from the series-connection position to the parallel-connection position, then the electric resistance through the coils is reduced to one-fourth, whereby an amount of current through the coils of the solenoid actuator is increased and the magnetic drive force generated in correspondence with the current is also increased.

What is claimed is:

1. A flow control solenoid valve apparatus, comprising:
    a flow control valve having a valve body and a valve spool slidable within said valve body for controlling a fluid flow rate through said flow control valve; and
    a solenoid actuator connected to said flow control valve for controlling the operation of said flow control valve;
    said solenoid actuator comprising:
        a magnetic core assembly connected to said valve body and having a central bore;
        a plunger connected to said valve spool and extending into said central bore of said magnetic core assembly;
        a pair of coils spaced apart from each other and supported within said magnetic core assembly around said plunger for generating first and second magnetic fields extending through said magnetic core assembly for acting on said plunger;
        a permanent magnet disposed within said magnetic core assembly between said coils for generating third and fourth magnetic fields acting on said plunger in a direction opposite to each other in an overlapping relationship with respect to said first and second magnetic fields; and
        means for overcoming a jamming of the valve spool within the valve body by substantially increasing the magnetic fields generated by the pair of coils and acting on the plunger, to attendantly enable the valve spool to shear through contaminant particles entrained in the fluid and causing the jamming,
    said overcoming means comprising switch means connected to said pair of coils for selectively switching said coils between a parallel connection in which said increased magnetic fields are generated and a series connection used during normal, unjammed control operations.

* * * * *